United States Patent [19]

Ito et al.

[11] 4,092,652
[45] May 30, 1978

[54] EXPOSURE INFORMATION INDICATING DEVICE FOR A CAMERA

[75] Inventors: Tadashi Ito; Fumio Ito, both of Yokohama; Yukio Mashimo, Tokyo; Nobuaki Sakurado, Yokohama; Nobuhiko Shinoda, Tokyo, all of Japan

[73] Assignee: Canon Kabushiki Kaisha, Tokyo, Japan

[21] Appl. No.: 828,175

[22] Filed: Aug. 26, 1977

Related U.S. Application Data

[63] Continuation of Ser. No. 597,993, Jul. 22, 1975, abandoned.

[30] Foreign Application Priority Data

Jul. 27, 1974  Japan .................................. 49-86369

[51] Int. Cl.² ........................ G03B 7/08; G03B 17/20
[52] U.S. Cl. .................................. 354/23 D; 354/53; 354/60 L
[58] Field of Search .................... 354/23 D, 53, 60 A, 354/60 L; 356/226; 250/214 D

[56] References Cited

U.S. PATENT DOCUMENTS

| 3,824,608 | 7/1974 | Toyoda ............................ 354/23 D |
| 3,843,249 | 10/1974 | Kitaura ............................ 354/23 D |
| 3,895,875 | 7/1975 | Kitaura et al. ..................... 354/53 |
| 3,909,137 | 9/1975 | Kisanuki ............................ 354/23 D |
| 3,928,854 | 12/1975 | Sakurada et al. ................. 354/23 D |
| 3,972,626 | 8/1976 | Laskowsi ........................... 354/23 D |

OTHER PUBLICATIONS

TTL Cookbook, Don Lancaster, 1974, pp. 292-295 and p. 73.
The TTL Data Book, Texas Instruments, 1976, pp. 7-115.

*Primary Examiner*—Russell E. Adams
*Attorney, Agent, or Firm*—Toren, McGeady and Stanger

[57] ABSTRACT

The analog signal corresponding to the brightness of the object to be photographed is converted into a digital signal by means of an A-D converter while a shutter control means adjust the shutter mechanism in accordance with the digital signal stored in the A-D converter whereby at the same time, a digital information indicating circuit indicates digitally the digital signal stored in the A-D converter. Hereby, the digital information indicating circuit is connected with the timing pulse forming circuit in such a manner that the indication circuit repeats the indication by means of the timing pulse forming circuit with a period allowing the photographer to visually recognize the digital information of the indicating circuit.

5 Claims, 3 Drawing Figures

4,092,652

EXPOSURE INFORMATION INDICATING DEVICE FOR A CAMERA

This is a continuation of application Ser. No. 597,993 filed July 22, 1975, now abandoned.

BACKGROUND OF THE INVENTION

1. Field of the Invention

The present invention relates to an exposure information indicating device, especially a digital indication device for a camera for digitally indicating the exposure information such as the shutter speed, the aperture value and so on in the view finder of the camera.

2. Description of the Prior Art

Generally speaking in case of a camera presenting an electrical exposure control device it is desired that the exposure informations such as the shutter speed, the aperture value and so on can visually be recognized in order to be able to make a record of the photographing data.

Thus, a digital information indicating device for a camera which is so designed that a digital indicator is connected to the output terminal of a register for temporally storing the digital exposure information in such a manner that the digital exposure information can visually be recognized by means of the digital indicator has been proposed by the U.S. Pat. No. 3,703,130.

Although in the case of the above mentioned digital information indicating device the light measuring circuit for the exposure amount control device is utilized also as the light measuring circuit for the indicating device and therefor the digital information indicating device is advantageous for a camera whose compactness is much appreciated, the digital indicating device also presents the shortcoming to be mentioned below. Namely, in the case of a camera presenting this kind of a digital exposure amount control device, the light measuring operation is repeated periodically in order to obtain a correct exposure amount and therefore the indication by means of the digital indication device is repeated in response to the repeated operation of the light measuring circuit because the light measuring circuit for the exposure amount control device is also utilized as the light measuring circuit for the digital indication device.

On the other hand, the photographer can not recognize the indication visually in case the digital indication is repeated with a period shorter than about 0.2 (S). Hereby the period of the repetition of the above mentioned light measuring operation is usually kept shorter than 0.2 (S) it is impossible to visually recognize the indication by means of the conventional digital indication device which is disadvantageous.

SUMMARY OF THE PRESENT INVENTION

The purpose of the present invention is to offer a digital indication device for a camera by means of which a compact camera can be obtained while the photographer can recognize the exposure information correctly.

A further purpose of the present invention is to offer a digital indication device for a camera by means of which a correct exposure information, after the completion of the light measurement, is indicated in a digital way.

A further purpose of the present invention is to offer a digital indication device the indicating time of which can be adjusted.

A further purposes of the present invention will be disclosed from the detailed explanation to be made below in accordance with the accompanying drawings.

DESCRIPTION OF THE PREFERRED EMBODIMENT

Figure 1:
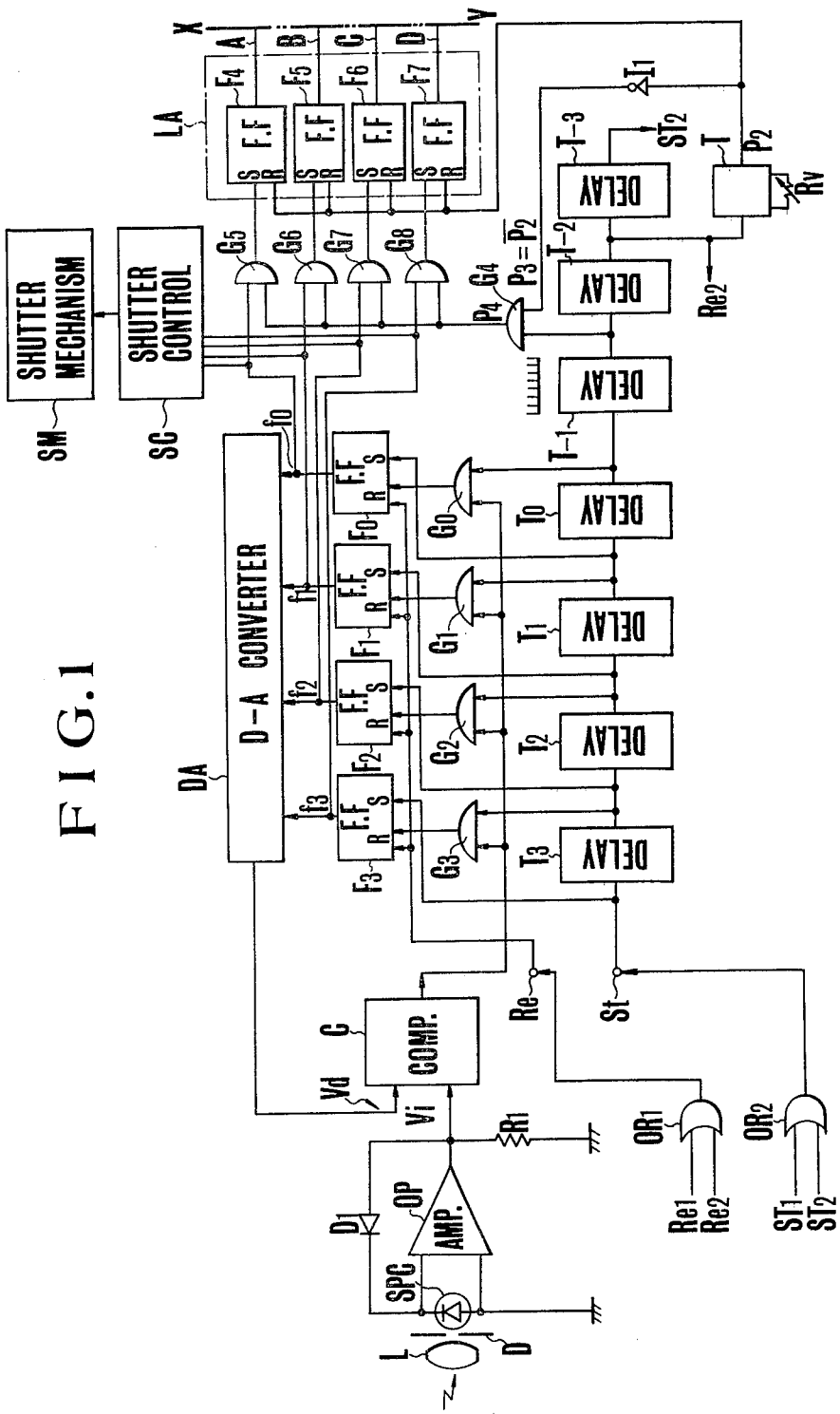
FIG. 1 shows the electrical circuit diagram of an embodiment mainly of the light measuring part of the camera for which the digital indication device in accordance with the present invention is applied.
Figure 2:
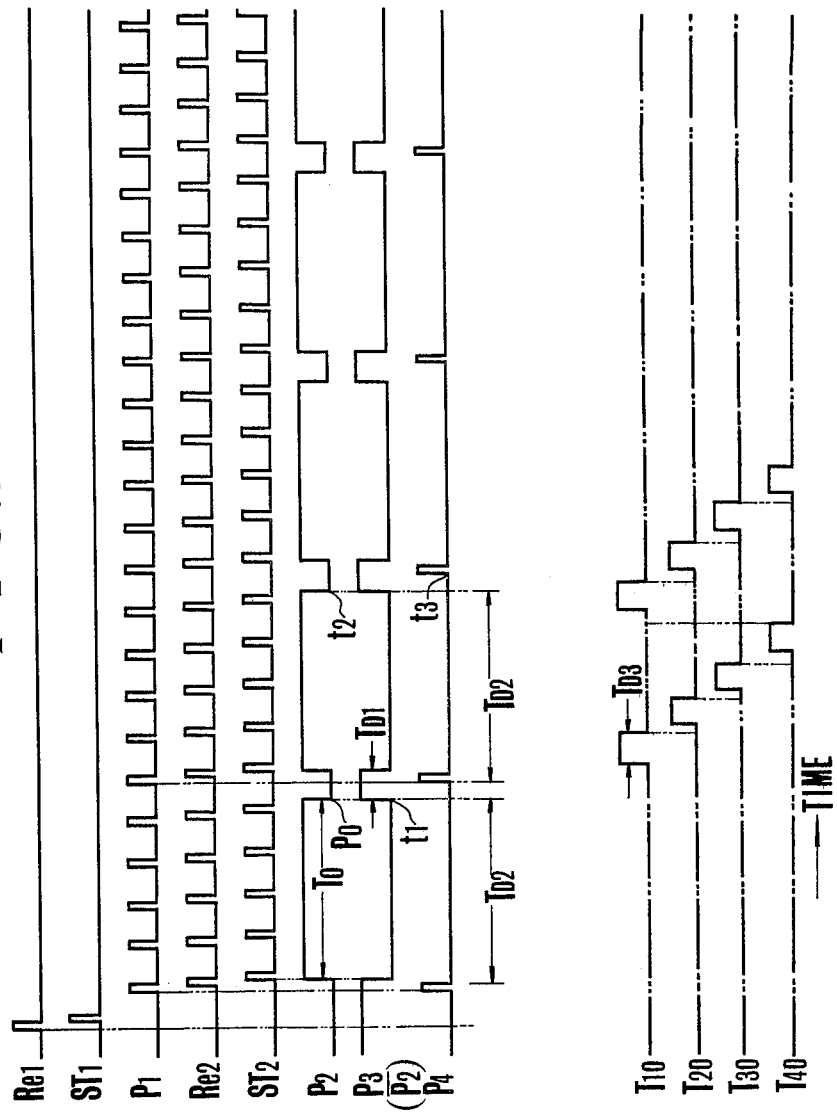
FIG. 2 shows the time chart diagram of the camera shown in FIG. 1.
Figure 3:
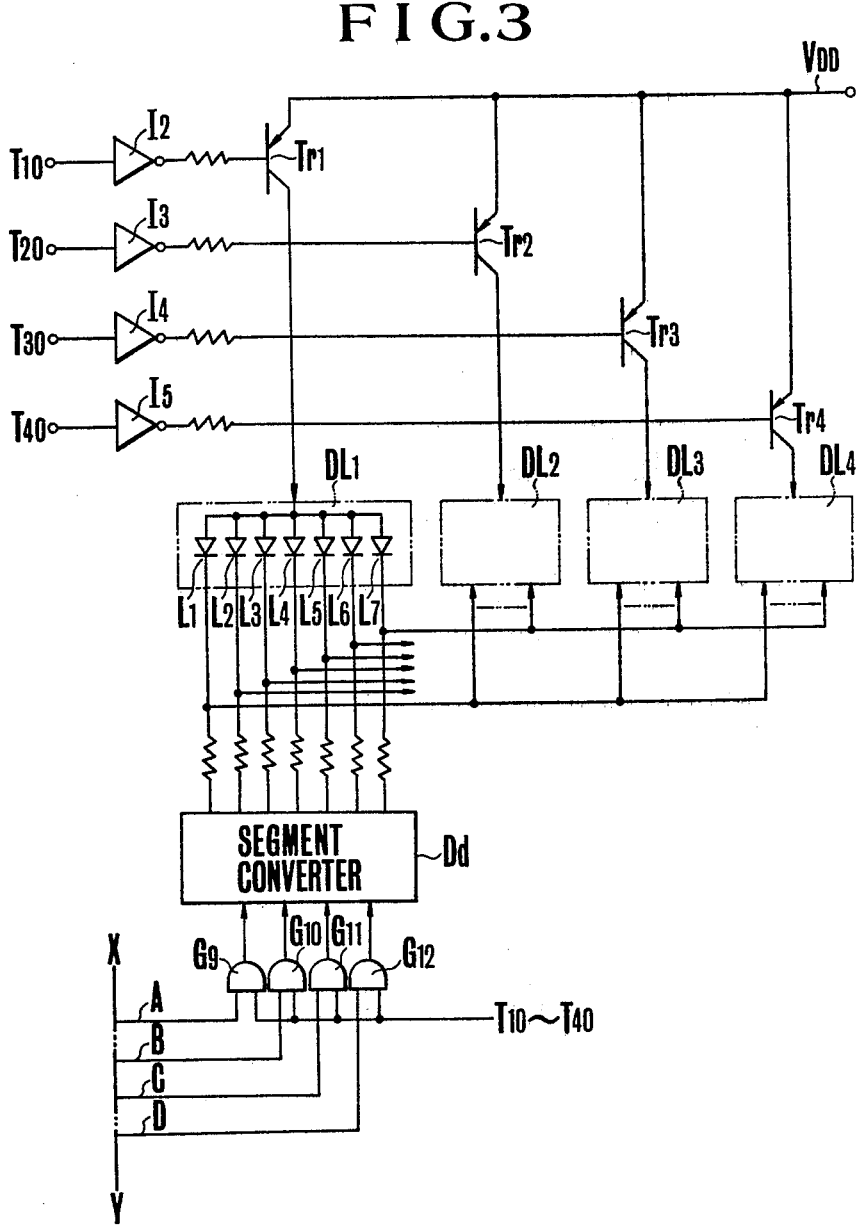
FIG. 3 shows the electrical circuit diagram of the digital indication device of the camera shown in FIG. 1.

FIG. 1 shows the electrical circuit diagram of the camera for which the digital indication device in accordance with the present invention is applied, whereby the drawing shows the timing pulse forming circuit for forming the timing pulse for the light measuring circuit, the processing circuit as well as the indication circuit. In the drawing, L is the optical system of the camera, D the diaphragm mechanism provided for the photographic lens (not shown in the drawing) of the camera, SPC the light sensitive element, such as, for example, a silicon photocell for sensing the light beam coming through the optical system L as well as the diaphragm mechanism D from the object to be photographed so as to convert it into an electrical quantity, OP the operational amplifier with whose inputs the light sensitive element SPC is connected, $D_1$ the diodes provided in the negative feed back path of the amplifier, whereby the diode $D_1$ is intended to logarithmically compress the electrical quantity coming from the light sensitive element SPC. $R_1$ is the resistor which is connected with the output terminal of the amplifier OP, whereby the elements SPC, $D_1$, OP and $R_1$ from the light measuring circuit. C is the comparator which compares the output signal $Vi$ of the light measuring circuit with the analog output signal $Vd$ of the digital-to-analog converter (to be explained later) in such a manner that the output signal "0" is produced when $Vi$ is larger than $Vd$ while the output signal "1" is produced when $Vi$ is smaller than $Vd$, $F_0$ to $F_3$ respectively a R - S flip-flop circuit forming a register and $G_0$ to $G_3$ respectively an AND gate whereby the output terminals of these gates $G_0$ - $G_3$ are, as is shown in the drawing, connected with the respective reset input terminals of the flip-flop circuit $F_0$ - $F_3$. DA is the D - A converter for converting the digital contents of the registers consisting of the above mentioned flip-flop circuits $F_0$ - $F_3$ into the analog amount whereby the output terminal of the D - A converter is connected with the one input terminal of the comparator C. Re is the input terminal of the reset pulse, St is the input terminal of the start pulse, $OR_1$ and $OR_2$ the OR-gates and $T_3$ - $T_0$ and $F_1$ - $F_3$ are respectively the delay circuits which are so designed that when the pulse is put in their input terminal, the pulse is generated at their output terminal after the elapse of the time $t$. The element C, $F_0$ - $F_3$, DA, C, $G_0$ - $G_3$, $T_0$ - $T_3$, $T_{-1}$ - $T_{-3}$ and $OR_1$ and $OR_2$ form the so called progressive comparative analog - digital converter. Hereby the output terminal of the above mentioned comparator C is connected with the one input terminals of the AND gates $G_0 - G_3$, while the output terminals of the delay circuits $T_0 - T_3$ are connected respectively with the other inputs of the AND-gates $G_0 - G_3$. Further the input terminals of these delay circuits $T_0 - T_3$ are connected with respective set input terminals of the corresponding flip-flop circuits $F_0$ 14 $F_3$. T is the timing pulse generating circuit for generating the timing signal as $P_2$ in FIG. 2, being synchronized with the reset pulse $Re_2$, whereby the circuit T presents the resistance Rv for adjusting the pulse width $T_0$ (see FIG. 2). $I_1$ is the inverter and $G_4$ the AND-gate being connected with the output terminal of the delay circuit $T_{-1}$ and that of the inverter $I_1$ whereby the elements T, $I_1$ and $G_4$ form the timing pulse forming circuit. LA is the latch circuit consisting of the AND-gates $G_5 - G_8$, and the flip-flop circuit $F_4 - F_7$ composing registors. The set input terminals of these flip-flop circuits $F_4 - F_7$ are connected with respective output terminals of the AND-gates $G_5 - G_8$, while the reset input terminals are connected with the output terminal of the above mentioned timing pulse generating circuit T. Hereby these flip-flop circuits $F_4 - F_7$ are so designed as to be reset, being synchronized with the rising up of the pulses (Po in the wave form P in FIG. 2) coming from the above mentioned timing pulse generating circuit. The output terminals A - D of these flip-flop circuits $F_4 - F_7$ are respectively connected with the one output terminal of the AND-gates shown in FIG. 3. SC is the shutter control circuit which is connected with the output terminal of the register $F_0 - F_3$ in such a manner that the shutter of the shutter mechanism SM is kept opened during the time corresponding to the content of the register. FIG. 3 shows the important part of the indication part of the camera shown in FIG. 1, whereby Dd is the segment converter which decodes the content of the latch circuit LA and at the same time encodes it for seven segments, and $DL_1 - DL_4$ are the indication elements consisting of the light emitting segments $L_1 - L_7$ arranged in form of numerical figure whereby $DL_1$ is the indication element for the highest figure, $DL_2$ and $DL_3$ for the next figures and $DL_4$ for the lowest figure. $I_2 - I_5$ are the inverters, $TR_1 - TR_4$ the PnP type transisters for switching and $T_1 - T_4$ the input terminals in which the timing pulses with pulse width as is shown in FIG. 2 are put. In order to make the explanation symplified, the connection between the input terminals of the indication elements $DL_2 - DL_4$ and the output terminals of the segment converter Dd is omitted whereby however in practice $DL_2 - DL_4$ presents light emitting segments like $DL_1$, being connected with the segment converter Dd like $DL_1$. The emitter electrodes of the above mentioned transisters $TR_1 - TR_4$ are hereby connected with the current source.

Below, the operation of the camera composed as explained above will be explained. Hereby the process concerning how the amount of the light coming from the object to be photographed is converted into a digital amount for the register will be explained.

Now let us suppose that the brightness Bv of the object to be photographed, received by the light sensing element SPC be 11, the analog voltage of 11 [V] be produced as the voltage corresponding to the brightness at the output terminal of the amplifier OP and D - A converter DA produce an output voltage of 1[V] for the value 1. By operating the release button (not shown in the drawing) of the camera the reset pulse $Re_1$ as is shown in FIG. 2 is put in the reset terminal Re through the OR-gate OR so as to reset the flip-flop circuits $F_0 -$ $F_3$, whereby the output voltage Vd of the D - A converter DA is 0[V]. When then the start pulse St as is shown in FIG. 2 is applied to the start terminal St through the OR-gate OR so as to set the flip-flop $F_3$ at "1," the output voltage Vd of the D - A converter DA is $2^3$[V]. This voltage Vd is compared with the output Vi of the light measuring circuit in the comparator C whereby the $Vd (= 2^3[V])$ is lower than the voltage Vi $(= 11[V])$ at the output terminal of the amplifier OP so that the output of the comparator C is "0." Although consequently after the elapse of the time t the start pulse $St_1$ is generated by the delay circuit $T_3$, the signal at the one input terminal of the AND-gate $G_3$ is "0" so that the output of the gate $G_3$ is kept at "0" while the flip-flop $F_3$ is not reset, being kept in the set state. Thus the output signal $f_3$ of the flip-flop $F_3$ is determined to be "1." Further by means of the output signal $St_1$ of the delay circuit $T_3$ the flip-flop $F_2$ is set and the output signal $f_2$ assumes the value "1." In consequence the output voltage Vd of the D - A converter DA assumes the value $(2^3 + 2^2)$[V]. This voltage Vd is higher than Vi so that the output signal of the comparator C is set at "1." After the elapse of the time $2 \times t$ after the start of the light measurement the start pulse $St_1$ is produced by the delay circuit $T_2$ so as to open the gate $G_2$ in such a manner that the start pulse $St_1$ is put in the reset input terminal of the flip-flop $F_2$, so that the output signal $f_2$ of the flip-flop $F_2$ is determined to be "0." In the same manner the flip-flop $F_1$ is kept in the set stage because the output of the gate $G_1$ is "0" while the flip-flop $F_0$ is also kept in the set state because the output of the gate $G_0$ is "0." In consequence the content of the register $F_0 - F_3$ is set at (1, 0, 1, 1). As explained above, the brightness (Bv = 11) of the object to be photographed is converted from the analog amount into the digital amount (1, 0, 1, 1). Then after the elapse of the time $t \times 6$ after the start of the light measurement the reset pulse $Re_2$ as is shown in FIG. 2 is produced by the relay circuit $T_{-2}$ and put in the reset input terminal of each flip-flop $F_0 - F_3$ through the OR-gate $OR_1$, so that the flip-flop $F_0 - F_3$ are set whereby their contents are all "0." After the elapse of the time t after the production of the reset pulse $Re_2$ the start pulse $ST_2$ as is shown in FIG. 2 is produced by the delay circuit $T_{-3}$ so as to set the flip-flop $F_3$ again in such a manner that the light measurement is started again. The start pulse $ST_2$ is produced by the delay circuit $T_{-3}$ after nearly 20[ms] after the start pulse $ST_1$ set the flip-flop $F_3$, so that the light measuring circuit repeats the A - D conversion at every 20[ms]. When then the shutter release button (not shown in the drawing) is pushed down, after the elapse of the time corresponding to the content of the register $F_0 - F_3$ the shutter control device SC opens the shutter of the shutter mechanism SM so as to take picture with a proper exposure.

Below the digital indication device in accordance with the present invention will be explained according to FIGS. 1, 2 and 3.

In the above explanation it is stated that the reset pulse $Re_2$ produced by the delay circuit $T_{-2}$ resets the flip-flop $F_0 - F_3$, whereby this reset pulse also triggers the timing pulse generating circuit T. In consequence the circuit T produces a signal in the wave form like $P_2$ shown in FIG. 2. After the elapse of the time $t_1$ the signal $P_3$ produced by the timing pulse generating circuit T is "1" during the time $T_{D1}$ as is shown in FIG. 2, so that when the signal $P_1$ from the delay circuit $T_{-1}$ is put in the AND gate $G_4$, the output of the gate $G_4$ assumes the value "1" whereby the contents of the register $F_0 - F_3$ is conveyed to the register $F_4 - F_7$ and stored there. The exposure information (in the present embodiment, the output voltage $Vi$ of the amplifier) stored in the register $F_0 - F_3$ is the result of the process of the diahragm value set on the diaphragm mechanism D and the brightness of the object to be photographed, in other words the voltage corresponding to the shutter speed so that the content of the register $F_4 - F_7$ also corresponds to the shutter speed. Therefore, in the explanation below the exposure information is called simply the shutter speed. Being synchronized with the timing pulse $T_{10} - T_{40}$ as is shown in FIG. 2 the shutter speed is given to the segment converter $Dd$, there converted into decimal number, encoded and then put in the indication element $DL_1$. On the other hand, being synchronized with the timing pulse $T_{10} - T_{40}$ the transistors $TR_1 - TR_4$ are brought into conductive state progressively the display element $DL_1$ shows the highest figure of the shutter speed, $DL_2$ the next highest figure, $DL_3$ the next figure and $DL_4$ the lowest figure progressively. In FIG. 2, the pulse width of the timing pulse $T_{10} - T_{40}$ is shown somewhat enlarged for the sake of explanation. However, in reality the pulse width $TD_3$ is remarkably narrow while the frequency of these timing pulses is very high so that the shutter speed is clearly recognizable to the eye of the photographer. After the further elapse of the time $t_2$ the output of the timing pulse generating circuit T assumes the value "1" so as to reset the register $F_4 - F_7$ (see FIG. 2) so that the display element $DL_1 - DL_4$ indicates the shutter speed of "0," while after the further elapse of the time $t_3$ the output of the gate $G_4$ assumes the value "1" again because of the above mentioned reason and the register $F_4 - F_7$ again reads the result of the light measurement out of the register $F_0 - F_3$ in such a manner that the result of the light measurement at the time $t_3$ is indicated by the display element $DL_1 - DL_4$. Although in the present invention, the light measurement is repeated at such a high frequency as $6 \times t$ determined by the delay circuit, the indication of the shutter speed is maintained during the time $T_{D_2}$ as is shown in FIG. 2 (in reality $T_{D_2}$ is set 0.3(S)) so that the photographer can recognize the shutter speed correctly. Further, this indication circuit utilizes the light measuring circuit of the exposure amount control device also for the light measuring circuit of the indication circuit so that this indication circuit is quite effective for obtaining a compact camera. Further after completion of one cycle of the light measuring operation, the light measurement completion signal $P_1$ (see FIG. 2) is produced by the progressive comparative A - D comparator while in the present invention the AND gate $G_4$ is so provided that when the above mentioned light measurement completion signal $P_1$ is produced the result of the light measurement stored in the register $F_0 - F_3$ is conveyed to the resister $F_4 - F_7$ for indication in such a manner that the shutter speed indicated by the indication element $DL_1 - DL_4$ is always a correct shutter speed value. In other words in the indication element $DL_1 - DL_4$ in accordance of the present invention the AND gate $G_4$ is provided so that the erroneous shutter speed before the completion of the light measurement can never be indicated.

What is claimed is:

1. A camera, comprising:
   (a) a light sensitive means for receiving an incident light from an object to be photographed and generating an analog signal corresponding to the amount of incident light received;
   (b) an analog-to-digital converter coupled to the light sensitive means for converting the analog signal into digital form, wherein said analog-to-digital converter repeats analog to digital conversion with a prescribed period;
   (c) an exposure control circuit for controlling the exposure value in response to the digital output signal from said analog-to-digital converter in digital form;
   (d) a timing pulse generator for producing time pulses having a period longer than the prescribed period;
   (e) a latching register;
   (f) a pulse-controlled gate means connected between the output of said light sensitive means and the input of said latching register for transferring a periodically renewed signal corresponding to the digital output signal from the analog-to-digital converter in digital form to said latching register in response to the time pulses; and
   (g) a digital information indicating means connected to the latching register for indicating an exposure value corresponding to the periodically renewed signal latched within the latching register in response to the timing pulses.

2. A camera according to claim 1, wherein said timing pulse generator is energizable in response to completion of the analog to digital conversion in the analog-to-digital converter.

3. A camera according to claim 1, wherein said pulse-controlled gate means includes a plurality of AND circuits energizable in response to the timing pulses.

4. A camera according to claim 1, wherein said timing pulse generator includes an adjusting means for varying the period of the timing pulses.

5. A camera according to claim 3, wherein said latching register includes a plurality of flip-flops having inputs connected to respective outputs of said AND circuits.

* * * * *